Figure 1:
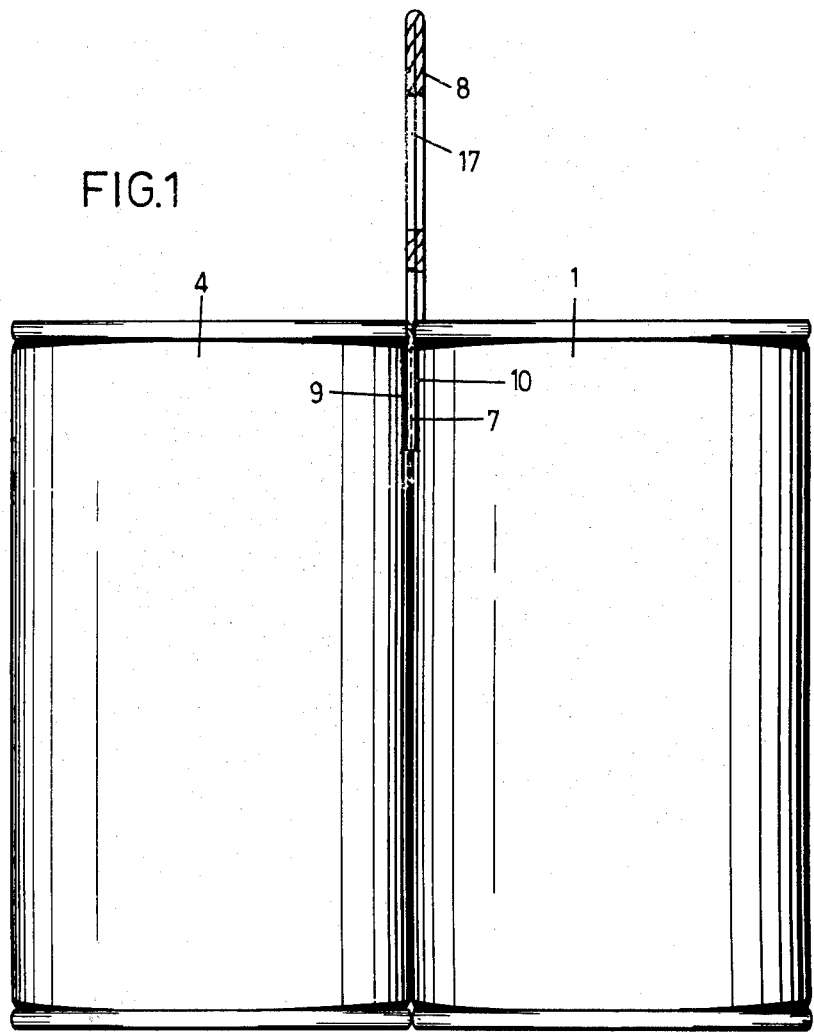

United States Patent [19]

Gravesteijn

[11] 3,924,739
[45] Dec. 9, 1975

[54] METHOD OF BRINGING A PLURALITY OF CONTAINERS IN TRANSPORTABLE CONDITION BY MEANS OF A CARRIER MEMBER AND AN ASSEMBLY OBTAINED BY APPLICATION OF SAID METHOD

[75] Inventor: Elbert Gravesteijn, Abcoude, Netherlands

[73] Assignee: Heineken Technisch Beheer B.V., Rotterdam, Netherlands

[22] Filed: Apr. 9, 1973

[21] Appl. No.: 349,098

[30] Foreign Application Priority Data
Apr. 10, 1972 Netherlands.................... 7204768

[52] U.S. Cl. ............... 206/157; 206/160; 206/460; 294/87.2; 205/162
[51] Int. Cl.². B65D 75/00; B65D 73/00; B66C 1/10
[58] Field of Search.................. 206/460, 145–162; 294/87.2

[56] References Cited
UNITED STATES PATENTS

| | | | |
|---|---|---|---|
| 2,677,460 | 5/1954 | Johnson et al. | 206/162 |
| 2,913,105 | 11/1959 | Brunsing | 206/156 |
| 3,759,378 | 9/1973 | Werth | 206/192 |

Primary Examiner—William T. Dixson, Jr.
Assistant Examiner—Douglas B. Farron
Attorney, Agent, or Firm—Eugene E. Geoffrey, Jr.

[57] ABSTRACT

A method of bringing a plurality of containers in particular beer tins, in a transportable condition by means of a carrier member interposed therebetween, which containers are interconnected to a rupturable assembly by glueing or such like process, in which the carrier member is connected to the containers also by glueing or such like process.

2 Claims, 2 Drawing Figures

U.S. Patent  Dec. 9, 1975  3,924,739

METHOD OF BRINGING A PLURALITY OF CONTAINERS IN TRANSPORTABLE CONDITION BY MEANS OF A CARRIER MEMBER AND AN ASSEMBLY OBTAINED BY APPLICATION OF SAID METHOD

The invention relates to a method of bringing in transportable condition a plurality of containers in particular beer tins, by means of a carrier member, said containers being interconnected to a rupturable assembly by glueing or such procedure. The invention also concerns an assembly obtained by application of said method.

Assemblies of circular-cylindrical tins with projecting upper and lower rim are known, which, by rupturable glue or solder drops, are interconnected exclusively at the upper rim. The carrier member extends with its lower strip of the handle opening underneath the connection points.

When in an assembly of e.g. six tins arranged in two rows of three, one of said rows is removed, the carrier member gets loose from the other three tins.

It is an object of the invention to eliminate this drawback. To this effect the method according to the invention is so performed that the carrier member is also connected to the containers by means of glueing or the like.

The method according to the invention can also be so performed that a glue layer of shorter length than the container height is applied on the zones of the circumference of the containers in spots where these contact the carrier member and where they are in mutual contact.

According to the invention there is further provided: an assembly comprising a plurality of containers with interposed carrier member, obtained by application of the method according to claim 1 or 2, wherein the containers have circular-cylindrical circumference and the carrier member consist of a flat piece of cardboard or plastic having at least one insertion opening for fingers, against which carriage member are glued the adjacent containers.

Figure 2:
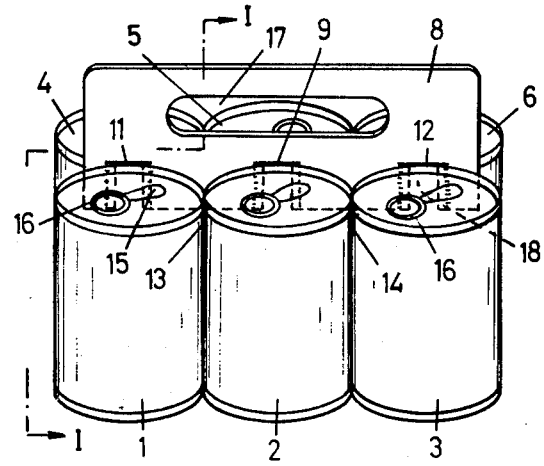

The invention will now be described in more detail with reference to the accompanying drawings, in which FIG. 1 is a cross section of an assembly of 2 × 3 beer tins and the associated carrier member on the line I—I in FIG. 2, on an enlarged scale, and FIG. 2 is a perspective view of said assembly.

Of the six beer tins 1–6 in FIG. 2, forming two rows of three tins each, FIG. 1 shows, on an enlarged scale, the tins 1 and 4 in side view. Between these two tins is inserted in the top zone the lower portion 7 of a carrier member 8 and, over the height of said lower portion, glue layers 9, 10 are applied on either side for connecting the tins to said carrier member. In FIG. 2 the top end of the glue layer 9 and glue layers 11 and 12 between the carrier member and the tins 1 and 3 is drawn with a full line, the lateral rims by dotted lines.

The bottom end of the carrier member may be provided, as drawn, with slots 18 wherein the glue can be applied and the tins 1, 4 nearly contact each other.

The tins 1 and 2, 2 and 3, 4 and 5, 5 and 6, respectively, are interconnected by corresponding glue layers on their top zone. FIG. 2 shows two of said glue layers indicated by 13 and 14.

All glue layers are to be found on the zones of the points of contact of the lateral walls of the tins.

The top ends of the tins wherein are present the easy-opening forming tear strips 15 with pull lug 16 are free of said glue layers.

Suitable materials for said carrier member are mini corrugated cardboard, duplex, solid carboard or plastic.

These materials should have a great tear resistance, good glue-bonding properties and good print-receiving characteristics.

A suitable glue may be used so-called hot-melt or a bicomponent glue. These glues should comply with a number of requirements which are: a good bonding, shock resistance, moisture resistance, mechanical applicability.

It is achieved with the invention that the assembly is cheaper than the one hitherto available on the market, offering to the consumer an easy way of carrying and transporting same. Besides, the shape is very attractive.

It will be clear that modifications are possible whithin the scope of the invention. For instance the carrier member may be provided with a plurality of round insertion openings.

We claim:

1. A transportable assembly of individual containers comprising an elongated handle consisting of a relatively rigid sheet of material having a finger receiving opening adjoining one elongated edge, at least two rows of circular containers with the containers of each row in substantial alignment, the other elongated edge portion of said material being disposed between said rows and means releasably bonding each of said containers to said handle portion disposed between said rows of containers, said handle including slots formed in said other elongated edge with the center-to-center spacing of said slots being equal to the diameter of the containers and the bases of said slots contacting said containers and releasably bonded to said containers.

2. A transportable assembly of individual containers comprising an elongated handle consisting of a relatively rigid sheet of material having a finger receiving opening adjoining one elongated edge, at least two rows of circular containers with the containers of each row in substantial alignment, the other elongated edge portion of said material being disposed between said rows and means releasably bonding each of said containers to said handle portion disposed between said rows of containers, said sheet of material being folded upon itself to provide an upper portion of double thickness and a lower portion of single thickness with said upper portion having the finger receiving opening extending therethrough and said lower portion extending between said rows of containers, said folded portion having an elongated edge bearing against the tops of the containers, the width of each of said slots being selected to cause corresponding containers of each row to at least partially enter and bear against the edges of said slots.

* * * * *